US012576385B2

(12) United States Patent
Liu et al.

(10) Patent No.: US 12,576,385 B2
(45) Date of Patent: Mar. 17, 2026

(54) CARBON MOLECULAR SIEVE ADSORBENT MONOLITHS AND METHODS FOR MAKING THE SAME

(71) Applicant: Dow Global Technologies LLC, Midland, MI (US)

(72) Inventors: Junqiang Liu, Freeport, TX (US); Janet M. Goss, Saginaw, MI (US)

(73) Assignee: Dow Global Technologies LLC, Midland, MI (US)

( * ) Notice: Subject to any disclaimer, the term of this patent is extended or adjusted under 35 U.S.C. 154(b) by 819 days.

(21) Appl. No.: 17/788,597

(22) PCT Filed: Dec. 16, 2020

(86) PCT No.: PCT/US2020/065195

§ 371 (c)(1),
(2) Date: Jun. 23, 2022

(87) PCT Pub. No.: WO2021/133596

PCT Pub. Date: Jul. 1, 2021

(65) Prior Publication Data

US 2023/0030536 A1 Feb. 2, 2023

Related U.S. Application Data

(60) Provisional application No. 62/954,166, filed on Dec. 27, 2019.

(51) Int. Cl.
| | |
|---|---|
| *B01J 20/20* | (2006.01) |
| *B01J 20/28* | (2006.01) |
| *B01J 20/30* | (2006.01) |
| *C01B 32/318* | (2017.01) |

(52) U.S. Cl.
CPC ......... *B01J 20/20* (2013.01); *B01J 20/28011* (2013.01); *B01J 20/28042* (2013.01); *B01J 20/3007* (2013.01); *B01J 20/3078* (2013.01); *C01B 32/318* (2017.08)

(58) Field of Classification Search
CPC ....................................................... B01J 20/20
See application file for complete search history.

(56) References Cited

U.S. PATENT DOCUMENTS

| | | | | |
|---|---|---|---|---|
| 3,235,323 A | * | 2/1966 | Peters | D06M 13/438 |
| | | | | 423/447.5 |
| 4,198,382 A | * | 4/1980 | Matsui | C04B 35/83 |
| | | | | 501/99 |
| 4,409,284 A | * | 10/1983 | Sugino | B29C 48/04 |
| | | | | 501/80 |
| 4,571,317 A | * | 2/1986 | Layden, Jr. | D01F 9/15 |
| | | | | 264/29.7 |
| 5,648,027 A | * | 7/1997 | Tajiri | C04B 38/0022 |
| | | | | 264/45.2 |
| 6,562,110 B2 | | 5/2003 | Koros et al. | |

| | | | | |
|---|---|---|---|---|
| 7,993,549 B2 | * | 8/2011 | Niewohner | F16D 69/023 |
| | | | | 264/29.7 |
| 8,911,534 B2 | | 12/2014 | Koros et al. | |
| 8,999,037 B2 | | 4/2015 | Singh et al. | |
| 9,527,045 B2 | | 12/2016 | Koros et al. | |
| 10,239,043 B2 | | 3/2019 | Liu et al. | |
| 2005/0118478 A1 | | 6/2005 | Kiefer et al. | |
| 2015/0315345 A1 | | 11/2015 | Zalamea Bustillo et al. | |
| 2018/0161736 A1 | | 6/2018 | Coignet et al. | |
| 2018/0229181 A1 | | 8/2018 | Zhang et al. | |
| 2019/0076793 A1 | | 3/2019 | Liu et al. | |

FOREIGN PATENT DOCUMENTS

| | | |
|---|---|---|
| CN | 105921024 B | 9/2016 |
| CN | 105980460 A | 9/2016 |
| CN | 106794443 A | 5/2017 |
| CN | 108697993 A | 10/2018 |
| CN | 110035819 A | 7/2019 |
| WO | 2016003680 A1 | 1/2016 |

OTHER PUBLICATIONS

US Final Office Action dated May 22, 2025, pertaining to U.S. Appl. No. 17/788,594, 13 pgs.
Communication pursuant to Article 94(3) EPC, dated May 26, 2025, pertaining to European Patent Application No. 20 829 162.5, 4 pgs.
Communication Pursuant to Rules 161(1) and 162 EPC dated Aug. 4, 2022, pertaining to EP Patent Application No. 20829162.5, 3 pgs.
International Preliminary Report on Patentability dated Aug. 16, 2022, pertaining to Int'l Patent Application No. PCT/US2020/065192, 8 pgs.
Communication Pursuant to Rules 161(1) and 162 EPC dated Aug. 3, 2022, pertaining to EP Patent Application No. 20829285.4, 3 pgs.
International Preliminary Report on Patentability dated Aug. 10, 2022, pertaining to Int'l Patent Application No. PCT/US2020/065195, 9 pgs.
Chinese Office Action dated Jan. 1, 2024, pertaining to CN Patent Application No. 202080089921.3, 12 pgs.

(Continued)

*Primary Examiner* — Stuart L Hendrickson
(74) *Attorney, Agent, or Firm* — Dinsmore & Shohl LLP

(57) ABSTRACT

Methods for forming a carbon molecular sieve includes loading polymer fibers into a mold and heating the mold containing the polymer fibers to a temperature in a range from 50° C. to 350° C. to form a polymer monolith. The polymer monolith is then pyrolized by heating to a temperature in a range from 500° C. to 1700° C. A carbon molecular sieve monolith includes a first end and a second end opposite the first end, and carbon molecular sieve fibers aligned in parallel from the first end of the carbon molecular sieve monolith to the second end of the carbon molecular sieve monolith. Channels extend from the first end of the carbon molecular sieve monolith to the second end of the carbon molecular sieve monolith, and outer surfaces of the carbon molecular sieve fibers are joined. The carbon molecular sieve monolith has a cell density of greater than 500 cells per square inch.

13 Claims, 6 Drawing Sheets

(56) References Cited

OTHER PUBLICATIONS

Chinese Office Action dated May 16, 2023, pertaining to CN Patent Application No. 202080089921.3.

Communication Pursuant to Article 94(3) EPC, dated Feb. 1, 2024, pertaining to EP Patent Application No. 20829285.4, 10 pgs.

International Search Report and Written Opinion dated Mar. 22, 2022, pertaining to Int'l Patent Application No. PCT/US2020/065195, 12 pgs.

International Search Report and Written Opinion dated Mar. 25, 2022, pertaining to Int'l Patent Application No. PCT/US2020/065192, 10 pgs.

Xu et al. "Matrimid® derived carbon molecular sieve hollow fiber membranes for ethylene/ethane separation" Journal of Membrane Science 380 (2011) 138-147.

Rezaei et al. "Optimum structured adsorbents for gas separation processes" Chemical Engineering Science 64 (2009) 5182-5191.

Moreno-Castilla et al. "Carbon-Based Honeycomb Monoliths for Environmental Gas-Phase Applications" Materials 2010, 3, 1203-1227.

Hughes "The Carbon Fibre/Epoxy Interface—A Review" Composites Science and Technology 41 (1991) 13-45.

Xu et al. "Olefins-selective asymmetric carbon molecular sieve hollow fiber membranes for hybrid membrane-distillation processes for olefin/paraffin separations" Journal of Membrane Science 423-424 (2012) 314-323.

Bonyadi et al. "The development of novel micro-capillary film membranes" Journal of Membrane Science 389 (2012) 137-147.

Brazil Technical Report dated Sep. 10, 2024, pertaining to BR Patent Application No. BR112022012500.3, 8 pgs.

Chinese Office Action dated Sep. 27, 2023, pertaining to CN Patent Application No. 202080094359.3, 16 pgs.

Chinese Office Action dated Oct. 10, 2023, pertaining to CN Patent Application No. 202080089921.3, 12 pgs.

Brazilian Technical Report dated Nov. 28, 2024, pertaining to BR Patent Application No. BR 112022012359-0, 10 pgs.

U.S. Non-Final Office Action dated Jan. 2, 2025, pertaining to U.S. Appl. No. 17/788,594, 12 pgs.

US Notice of Allowance dated Jul. 16, 2025, pertaining to U.S. Appl. No. 17/788,594, 7 pgs.

Communication pursuant to Article 94(3) EPC dated Oct. 29, 2025, pertaining to EP Patent Application No. 20829285.4, 7 pgs.

Korean Office Action dated Dec. 12, 2025, pertaining to KR Patent Application No. 10-2022-7025372, 24 pgs.

* cited by examiner 7.0kV 9.8mm x50 SE(M)    1.00mm

CARBON MOLECULAR SIEVE ADSORBENT MONOLITHS AND METHODS FOR MAKING THE SAME

CROSS REFERENCE TO RELATED APPLICATIONS

This application is a national stage entry of PCT/US2020/065195 filed on Dec. 16, 2020, which claims priority to U.S. Provisional Patent Application No. 62/954,166 filed on Dec. 27, 2019, the entire disclosures of which are hereby incorporated by reference.

BACKGROUND

Field

The present specification generally relates to carbon molecular sieve adsorbents for gas separation. In particular, the present specification relates to carbon molecular sieve adsorbent monoliths for gas separation and methods for making carbon molecular sieve adsorbent monoliths for gas separation.

Technical Background

Carbon molecular sieves (CMS) and CMS membranes have been used to separate gases. CMSs may be prepared from a variety of resins that are pyrolyzed at various temperatures and/or under various conditions. The pyrolysis reduces the resins to carbon, but maintains at least some porosity in the pyrolyzed product, in the form of micropores. The CMSs thus formed may then be employed in conventional gas separations equipment employing adsorption of particular gases, such as packed beds, columns, and the like, where the micropore size determines which gas in a gas mixture is adsorbed and which is not. Adsorption and desorption techniques may be alternated to carry out the separation, according to, for example, conventional pressure swing adsorption (PSA) or temperature swing adsorption (TSA) methods. CMS membranes have also been used to separate gases by flowing gas mixtures through the CMS membranes.

Structured adsorbents can reduce the adsorbent bed size and capital cost of PSA using shorter cycle operations without causing pressure drop and mass transfer issues.

Accordingly, a need exists for structure adsorbents and methods for making structured adsorbents for gas separation.

SUMMARY

According to one embodiment, a method for forming a carbon molecular sieve comprises: loading polymer fibers into a mold; heating the mold containing the polymer fibers to a temperature in a range from 50° C. to 350° C. to form a polymer monolith; and pyrolizing the polymer monolith by heating the polymer monolith to a temperature in a range from 500° C. to 1700° C.

In another embodiment, a carbon molecular sieve monolith comprises: a first end and a second end opposite the first end; carbon molecular sieve fibers aligned in parallel such that first axial ends of the carbon molecular sieve fibers are positioned at the first end of the carbon molecular sieve monolith and second axial ends of the carbon molecular sieve fibers are aligned at the second end of the carbon molecular sieve monolith; and channels extending from the first end of the carbon molecular sieve monolith to the second end of the carbon molecular sieve monolith, wherein outer surfaces of the carbon molecular sieve fibers are joined together to form the carbon molecular sieve monolith, and the carbon molecular sieve monolith has a cell density of greater than 500 cells per square inch.

Additional features and advantages will be set forth in the detailed description that follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
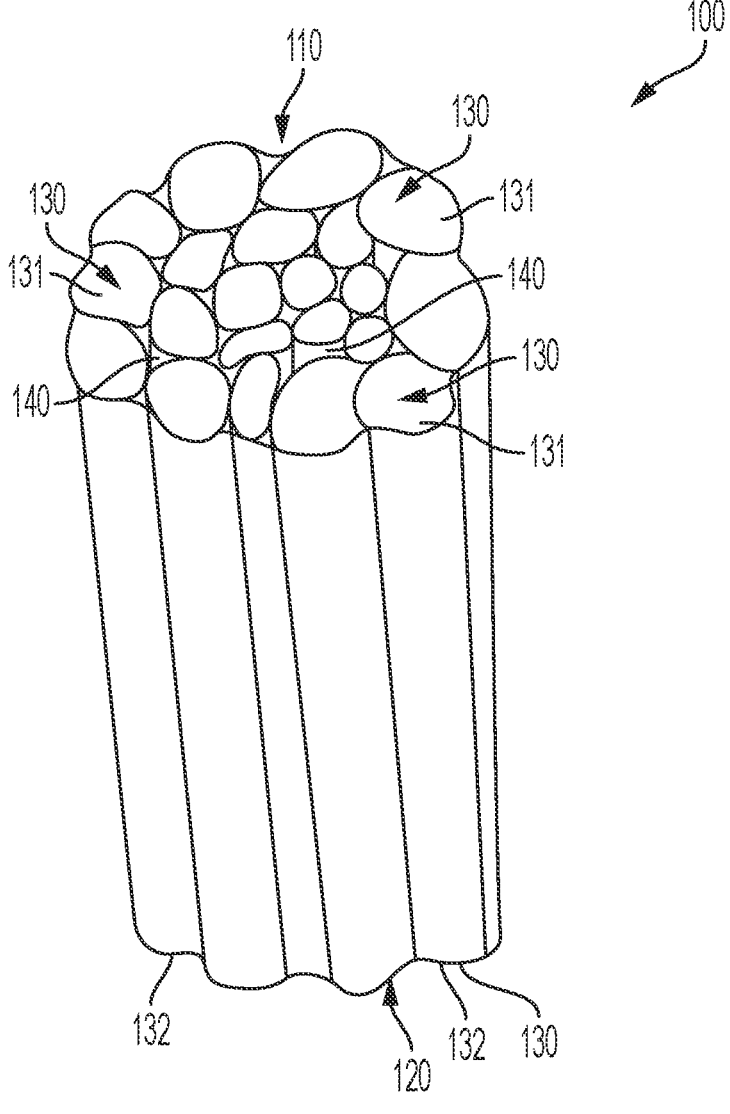
FIG. 1 is a schematic of a carbon molecular sieve adsorbent monolith made from solid carbon molecular sieve fibers according to embodiments disclosed and described herein.

Reference will now be made in detail to embodiments of carbon molecular sieve adsorbent monoliths and methods for making carbon molecular sieve adsorbent monoliths, embodiments of which are illustrated in the accompanying drawings. Whenever possible, the same reference numerals will be used throughout the drawings to refer to the same or like parts. In one embodiment, a method for forming a carbon molecular sieve comprises: loading polymer fibers into a mold; heating the mold containing the polymer fibers to a temperature in a range from 50° C. to 350° C. to form a polymer monolith; and pyrolizing the polymer monolith by heating the polymer monolith to a temperature in a range from 500° C. to 1700° C. In another embodiment, a carbon molecular sieve monolith comprises: a first end and a second end opposite the first end; polymer fibers aligned in parallel such that first axial ends of the polymer fibers are positioned at the first end of the carbon molecular sieve monolith and second axial ends of the polymer fibers are aligned at the second end of the carbon molecular sieve monolith; and channels extending from the first end of the carbon molecular sieve monolith to the second end of the carbon molecular sieve monolith, wherein outer surfaces of the polymer fibers are joined together to form the carbon molecular sieve monolith, and the carbon molecular sieve monolith has a cell density of greater than 500 cells per square inch. Carbon molecular sieve adsorbent monoliths according to embodiments will now be described with reference to the appended drawings.

Figure 2:
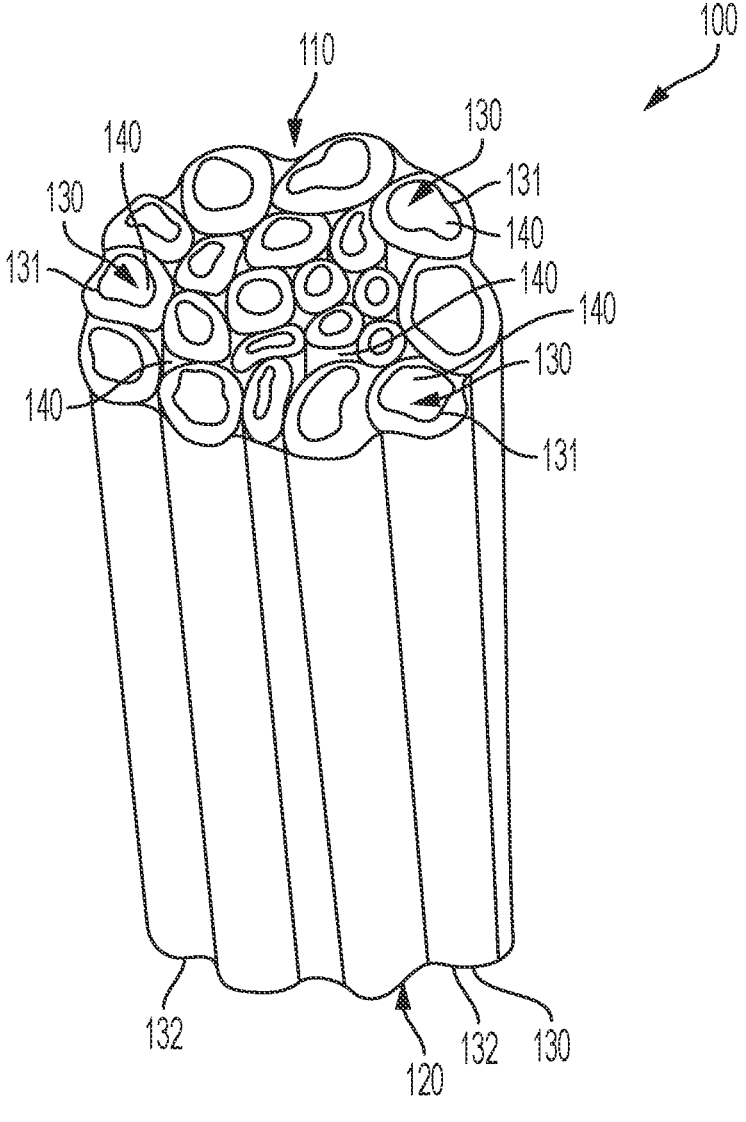
FIG. 2 is a schematic of a carbon molecular sieve adsorbent monolith made from hollow carbon molecular sieve fibers according to embodiments disclosed and described herein.

With reference now to FIG. 1 and FIG. 2, carbon molecular sieve adsorbent monoliths 100 according to embodiments includes a first end 110 and a second end 120 opposite of the first end 110. The carbon molecular sieve adsorbent monolith 100 comprises fibers 130 aligned in parallel such that first axial ends 131 of the fibers are positioned at the first end 110 of the carbon molecular sieve adsorbent monolith 100 and second axial ends of the fibers 132 are aligned at the second end 132 of the carbon molecular sieve adsorbent monolith 100. It should be understood that in FIG. 1 not all of the fibers 130, first axial ends 131, and second axial ends 132 are labeled. In embodiments, and as shown in FIG. 1, the fibers 130 of the carbon molecular sieve adsorbent monolith 100 are solid fibers. In embodiments, and as shown in FIG. 2, the fibers 130 of the of the carbon molecular sieve adsorbent monolith 100 are hollow fibers. As used herein "hollow fibers" indicate fibers that have a central conduit running from one end of the fiber to another end of the fiber.

As shown in the embodiments of the carbon molecular sieve adsorbent monolith 100 depicted in FIG. 1 and FIG. 2, the carbon molecular sieve adsorbent monolith 100 also includes channels 140 that extend from the first end 110 of the carbon molecular sieve adsorbent monolith 100 to the second end 120 of the carbon molecular sieve adsorbent monolith 100. According to embodiments, and as shown in FIG. 1 and FIG. 2, the channels 140 can be formed from spaces and gaps between the fibers 130 that extend from the first end 110 of the carbon molecular sieve adsorbent monolith 100 to the second end 120 of the carbon molecular sieve adsorbent monolith 100. In embodiments, and as shown in FIG. 2, the conduit of the hollow fibers 130 can also form channels 140. It should be understood that not all channels 140 of the of the carbon molecular sieve adsorbent monolith 100 are labeled in FIG. 1 and FIG. 2.

In embodiments where the fibers 130 are hollow, the inner diameter of the hollow fibers 130 is from 5% to 95% of the outer diameter of the fibers 130, such as from 5% to 90% of the outer diameter of the fibers 130, from 5% to 85% of the outer diameter of the fibers 130, from 5% to 80% of the outer diameter of the fibers 130, from 5% to 75% of the outer diameter of the fibers 130, from 5% to 70% of the outer diameter of the fibers 130, from 5% to 65% of the outer diameter of the fibers 130, from 5% to 60% of the outer diameter of the fibers 130, from 5% to 55% of the outer diameter of the fibers 130, from 5% to 50% of the outer diameter of the fibers 130, from 5% to 45% of the outer diameter of the fibers 130, from 5% to 40% of the outer diameter of the fibers 130, from 5% to 35% of the outer diameter of the fibers 130, from 5% to 30% of the outer diameter of the fibers 130, from 5% to 25% of the outer diameter of the fibers 130, from 5% to 20% of the outer diameter of the fibers 130, from 5% to 15% of the outer diameter of the fibers 130, or from 5% to 10% of the outer diameter of the fibers 130. In embodiments, the inner diameter of the hollow fibers 130 is from 10% to 95% of the outer diameter of the fibers 130, such as from 15% to 95% of the outer diameter of the fibers 130, from 20% to 95% of the outer diameter of the fibers 130, from 25% to 95% of the outer diameter of the fibers 130, from 30% to 95% of the outer diameter of the fibers 130, from 35% to 95% of the outer diameter of the fibers 130, from 40% to 95% of the outer diameter of the fibers 130, from 45% to 95% of the outer diameter of the fibers 130, from 50% to 95% of the outer diameter of the fibers 130, from 55% to 95% of the outer diameter of the fibers 130, from 60% to 95% of the outer diameter of the fibers 130, from 65% to 95% of the outer diameter of the fibers 130, from 70% to 95% of the outer diameter of the fibers 130, from 75% to 95% of the outer diameter of the fibers 130, from 80% to 95% of the outer diameter of the fibers 130, from 85% to 95% of the outer diameter of the fibers 130, or from 90% to 95% of the outer diameter of the fibers 130. In embodiments, the inner diameter of the hollow fibers 130 is from 10% to 90% of the outer diameter of the fibers 130, such as from 15% to 85% of the outer diameter of the fibers 130, from 20% to 80% of the outer diameter of the fibers 130, from 25% to 75% of the outer diameter of the fibers 130, from 30% to 70% of the outer diameter of the fibers 130, from 35% to 65% of the outer diameter of the fibers 130, from 40% to 60% of the outer diameter of the fibers 130, or from 45% to 55% of the outer diameter of the fibers 130.

According to embodiments, the carbon molecular sieve adsorbent monolith 100 is formed by having the outer surfaces of the fibers 130 joined together to form the carbon molecular sieve adsorbent monolith 100. Methods for joining the outer surfaces of the fibers 130 to form the carbon molecular sieve adsorbent monolith 100 will be described in more detail herein. As shown in the embodiments depicted in FIG. 1 and FIG. 2, outer surfaces of the fibers 130 are in physical contact with adjacent fibers 130, and by forming carbon molecular sieve adsorbent monolith 100 according to embodiments disclosed and described herein, the outer surfaces of adjacent fibers 130 are physically joined together. According to embodiments, the outer surfaces of adjacent fibers that are in physical contact are joined together, such as by fusing, such that the outer surfaces of adjacent fibers that are in physical contact are joined and form a combined, homogenous surface of the adjacent fibers 130. In this way, the individual fibers are joined together to form the carbon molecular sieve adsorbent monolith 100. Accordingly, and as used herein, the term "monolith" refers to a number of fibers that are joined together into a unitary structure that is not easily separable. The carbon molecular sieve adsorbent monolith 100 of embodiments disclosed and described herein are easily transportable and maintains its shape and integrity during use. The monolith also has regular micro-channels that provide large contact area but cause low pressure drops when fluid flow through it.

In embodiments, and regardless of whether the fibers 130 are hollow or solid, the carbon molecular sieve adsorbent monolith 100 has large cell density greater than 500 cells per square inch. The cells per square inch is measured at the first end 110 or the second end 120 of the carbon molecular sieve adsorbent monolith 100 and indicates the number of cells (space between the fiber, and inside the fiber for hollow fiber) in cross section at the surface. In embodiments, the carbon molecular sieve adsorbent monolith 100 has a cell density of greater than 550 cells per square inch, such as greater than 600 cells per square inch, greater than 650 cells per square inch, greater than 700 cells per square inch, greater than 750 cells per square inch, greater than 800 cells per square inch, greater than 850 cells per square inch, greater than 900 cells per square inch, greater than 950 cells per square inch, greater than 1000 cells per square inch, greater than 1050 cells per square inch, greater than 1100 cells per square inch, greater than 1150 cells per square inch, greater than 1200 cells per square inch, greater than 1250 cells per square inch, greater than 1300 cells per square inch, greater than 1350 cells per square inch, greater than 1400 cells per square inch, or greater than 1450 cells per square inch. In embodiments, the carbon molecular sieve adsorbent monolith 100 has a cell density from greater than 600 to less than 1500 cells per square inch, such as from greater than 700 to less than 1500 cells per square inch, from greater than 800 to less than 1500 cells per square inch, from greater than 900 to less than 1500 cells per square inch, from greater than 1000 to less than 1500 cells per square inch, from greater than 1100 to less than 1500 cells per square inch, from greater than 1200 to less than 1500 cells per square inch, from greater than 1300 to less than 1500 cells per square inch, or from greater than 1400 to less than 1500 cells per square inch. In embodiments, the carbon molecular sieve adsorbent monolith 100 has a cell density from greater than 500 to less than 1400 cells per square inch, such as from greater than 500 to less than 1300 cells per square inch, from greater than 500 to less than 1200 cells per square inch, from greater than 500 to less than 1100 cells per square inch, from greater than 500 to less than 1000 cells per square inch, from greater than 500 to less than 900 cells per square inch, from greater than 500 to less than 800 cells per square inch, from greater than 500 to less than 700 cells per square inch, or from greater than 500 to less than 600 cells per square inch. In embodiments, the carbon molecular sieve adsorbent monolith 100 has a cell density from greater than 600 to less than 1400 cells per square inch, from greater than 700 to less than 1300 cells per square inch, from greater than 800 to less than 1200 cells per square inch, or from greater than 900 to less than 1100 cells per square inch.

In embodiments, the fibers 130 have a cross-sectional diameter that is less than 500 μm, such as less than 450 μm, less than 400 μm, less than 350 μm, less than 300 μm, less than 250 μm, less than 200 μm, or less than 150 μm. In embodiments, the fibers 130 have a cross-sectional diameter that is from 10 μm to 1000 μm, from 100 μm to 1000 μm, from 200 μm to 1000 μm, from 300 μm to 1000 μm, from 400 μm to 1000 μm, from 500 μm to 1000 μm, from 600 μm to 1000 μm, from 700 μm to 1000 μm, from 800 μm to 1000 μm, from 900 μm to 1000 μm, from 10 μm to 900 μm, from 100 μm to 900 μm, from 200 μm to 900 μm, from 300 μm to 900 μm, from 400 μm to 900 μm, from 500 μm to 900 μm, from 600 μm to 900 μm, from 700 μm to 900 μm, from 800 μm to 900 μm, from 10 μm to 800 μm, from 100 μm to 800 μm, from 200 μm to 800 μm, from 300 μm to 800 μm, from 400 μm to 800 μm, from 500 μm to 800 μm, from 600 μm to 800 μm, from 700 μm to 800 μm, from 10 μm to 700 μm, from 100 μm to 700 μm, from 200 μm to 700 μm, from 300 μm to 700 μm, from 400 μm to 700 μm, from 500 μm to 700 μm, from 600 μm to 700 μm, from 10 μm to 600 μm, from 100 μm to 600 μm, from 200 μm to 600 μm, from 300 μm to 600 μm, from 400 μm to 600 μm, from 500 μm to 600 μm, from 10 μm to 500 μm, from 100 μm to 500 μm, from 200 μm to 500 μm, from 300 μm to 500 μm, from 400 μm to 500 μm, from 10 μm to 500 μm, from 100 μm to 500 μm, from 200 μm to 500 μm, from 300 μm to 500 μm, from 400 μm to 500 μm, from 10 μm to 400 μm, from 100 μm to 400 μm, from 200 μm to 400 μm, from 300 μm to 400 μm, from 10

μm to 300 μm, from 100 μm to 300 μm, from 200 μm to 300 μm, from 300 μm to 300 μm, from 10 μm to 300 μm, from 100 μm to 300 μm, from 200 μm to 300 μm, from 10 μm to 200 μm, from 100 μm to 200 μm or from 10 μm to 100 μm. In embodiments, the fibers 130 have a cross-sectional diameter that is from 10 μm to 1000 μm, such as from 20 μm to 500 μm, or from 30 μm to 200 μm. It should be understood that smaller diameter fibers 130 provide more efficient separation, but if the cross-sectional diameter of the fibers 130 is too small, the pressure drop across the carbon molecular sieve adsorbent monolith 100 increases to undesirable levels.

According to embodiments, the fibers 130 are formed from one of polyimide or polyvinylidene chloride (PVDC). Accordingly, in embodiments, the fibers 130 comprise, consist essentially or, or consist of PVDC. In embodiments, the fibers 130 comprise, consist essentially or, or consist of polyimide. In embodiments, the fibers 130 comprise, consist essentially or, or consist of polyimide and PVDC. Suitable PVDC is disclosed in U.S. Pat. No. 10,239,043, which is incorporated herein by reference in its entirety, and is also described herein below. Polyimides that can be used to form fibers of embodiments include BTDA-DAPI (Matrimid) as described in U.S. Pat. No. 8,911,534, which is incorporated herein by reference in its entirety; 6FDA/BPDA-DAM, 6FDA-6FpDA, 6FDA-IPDA, and other 6FDA dianhydride based polyimides described in U.S. Pat. Nos. 8,999,037, 6,562,110, and 9,527,045, each of which are incorporated herein by reference in its entirety.

In general, embodiments provide CMS absorbents that are useful for a variety of separations. Such separations may include, but are not necessarily limited to, the following pairs of gases wherein at least one molecule, and in some embodiments both molecules, has/have a representative molecular diameter falling within the 3.0 A to 5.0 A range: propylene $(C_3H_6)$ and propane $(C_3H_8)$; carbon dioxide $(CO_2)$ and nitrogen $(N_2)$; $N_2$ and methane $(CH_4)$; ethylene $(C_2H_4)$ and ethane $(C_2H_6)$; and n-butane $(n\text{-}C_4H_{10})$ and isobutane $(i\text{-}C_4H_{10})$. Embodiments of molecular sieves may be conveniently used in typical separations systems, and particularly in separations systems based upon, for example, pressure or temperature swing principles.

The CMSs of embodiments may be prepared from a vinylidene chloride copolymer, comprising a vinylidene chloride monomer and at least one additional comonomer. The comonomer may be selected from a variety of materials, including in particular embodiments a vinyl monomer, vinyl chloride monomer, an acrylate monomer, a methacrylate monomer, a styrenic monomer, acrylonitrile, methacrylonitrile, itaconic acid, chlorotrifluoroethylene, and combinations thereof. In embodiments, the vinyl monomers include vinyl chloride, vinyl acetate, acrylonitrile, and combinations thereof. Exemplary acrylate monomers include methyl acrylate, ethyl acrylate, butyl acrylate, and combinations thereof. More particular examples of methacrylate monomers include methyl methacrylate, butyl methacrylate, and combinations thereof. An example of styrenic monomers is styrene itself.

In embodiments, the vinylidene chloride based copolymer, which is also referred to herein as PVDC, includes at least 60 wt % of vinylidene chloride, based on total weight of the copolymer, such as at least 70 wt %. However, it is further desired that, in embodiments, the PVDC contains a maximum of 97 wt % vinylidene chloride, and thus in embodiments contains a minimum of at least 3 wt % of the comonomer or comonomer combination, such as from 3 wt % to 40 wt %, from 3 wt % to 30 wt %, or from 3 wt % to 20 wt %.

In embodiments, PVDCs include an acrylate comonomer, such as methyl acrylate, ethyl acrylate, butyl acrylate, or a combination thereof, in an amount from 3 wt % to 30 wt %, based on the weight of the PVDC as a whole, such as from 3.5 wt % to 15 wt %, or from 4 wt % to 12 wt %. In one or more embodiments, the PVDC used includes vinyl chloride monomer in an amount from 3 wt % to 30 wt %, such as from 7 wt % to 28 wt %, or from 9 wt % to 25 wt %. In embodiments, the overall weight average molecular weight (Mw) of the PVDC copolymer may range from 10,000 Mw to 250,000 Mw, such as from 50,000 Mw to 200,000 Mw, or from 60,000 Mw to 150,000 Mw.

According to one or more embodiments, additives may also be included in the PVDC. Common additives may include, but are not necessarily limited to, epoxidized oil stabilizers such as epoxidized soybean oil, epoxidized linseed oil, and the diglycidyl ether of bisphenol A. Also frequently employed are liquid plasticizers such as aliphatic and aromatic esters, including for example dibutyl sebacate, acetyl tributyl citrate, dioctyl phthalate, and the like, and combinations thereof. Other common additives may include lubricants, such as polyethylene wax, paraffin wax, oxidized polyethylene wax, and combinations thereof. Lubricants may optionally be included, and may comprise, for example, high density polyethylene, acrylate copolymers and silicone polymers, and combinations thereof. Another group of additives that may be included are acid scavengers such as epoxy compounds, magnesium hydroxide, magnesium oxide, tetrasodium pyrophosphate, calcium phosphate, magnesium phosphate, DHT 4A (a synthetic hydrotalcite-like halogen scavenger available from Kyowa Chemical Industry), calcium oxide, calcium carbonate, and combinations thereof. Antioxidants such as phenolics may also be incorporated. Combinations of any or all of these types of additives may be included in the PVDC.

In proportion, and according to embodiments, the total amount of all additives combined be no more than 8 wt %, such as no more than 3 wt %. In embodiments, however, an amount of all additives combined of at least 2 wt % may be used, with use thereof therefore ranging preferably from 2 wt % to 8 wt %, such as from 2 wt % to 3 wt %. Those skilled in the art will be aware of the use of such additives and their indications and contraindications without further direction herein.

A variety of means and methods for preparing copolymers can be used to form the PVDC of embodiments. However, in general any of the typical or conventional methods of polymerization, including but not limited to mass polymerization, suspension polymerization, and emulsion polymerization, and preferably suspension polymerization or emulsion polymerization, may be employed. In embodiments, polymerization is carried out at a temperature that ensures avoidance of degradation of all of the PVDC components, such as from 10° C. to 120° C., from 20° C. to 100° C., or from 30° C. to 90° C.

Following completion of the copolymerization, the PVDC of embodiments may be melt-extruded to form the PVDC into fibers. In embodiments, the melt-extruded fiber precursor material has a maximum thickness ranging from 10 μm to 1000 μm, such as from 20 μm to 500 μm, or from 50 μm to 200 μm. Fibers may be produced by uniaxial stretching using known fiber processes for PVDC copolymers, and may be round, shaped, hollow, or a combination thereof, or of any other desired fiber morphology. It is also contemplated fibers may be coextruded with multiple PVDC copolymers and/or with other polymers.

It is noted that according to embodiments, the fiber preparation process may optionally include stretching, such as stretching of the resin to form a melt-extruded fiber. This stretching may, in embodiments, be particularly effective in inducing more rapid crystallization and in increasing, and therefore improving, alignment of the PVDC crystallites. Desirably the stretch ratio ranges from 1 to 8, such as from 1 to 6, from 1 to 4, or from 2 to 4.

In embodiments, the crystallinity of the fiber precursor ranges from 25% to 75%, as measured by differential scanning calorimetry (DSC) according to ASTM D3418. In embodiments, the crystallinity of the fiber precursor ranges from 30% to 55%, such as from 35% to 50%. While discussion of the significance of the crystallinity of the copolymer, which serves as a precursor to the carbonized microporous composition ultimately used for separations purposes, is set forth in greater detail herein below, it is noted at this point that, surprisingly, it has been found that ensuring a given level of crystallinity within the designated range helps achieve the desired average micropore size and average micropore volume, following the pyrolysis, in the final CMS. It is noted that homopolymerized PVDC generally exhibits an as-polymerized crystallinity greater than 75%, and that it has surprisingly been found to be significant that the PVDC be either copolymerized with an adequate amount of at least one of the listed monomers, or melt-extruded (with or without stretching), or both, in order to ensure the designated level of precursor (i.e., pre-pyrolysis) crystallinity (i.e., from 25% to 75%) specified herein. Thus, inclusion of a comonomer generally helps to reduce precursor crystallinity to ensure the desired range, and also to reduce the melt temperature and thereby improve processability of the resulting copolymer. In general, inclusion of bulkier monomers may tend to reduce overall copolymer crystallinity by a greater amount than inclusion of less bulky monomers. Thus, for example, butyl acrylate will tend to reduce crystallinity more than, for example, methyl acrylate or ethyl acrylate, assuming such is/are used in the same mole percent (mol %) based on final copolymer composition.

In embodiments, the PVDC has a peak melting temperature in a range from 100° C. to 200° C., from 110° C. to 200° C., from 120° C. to 200° C., from 130° C. to 200° C., from 140° C. to 200° C., from 150° C. to 200° C., from 160° C. to 200° C., from 170° C. to 200° C., from 180° C. to 200° C., from 190° C. to 200° C., from 100° C. to 190° C., from 110° C. to 190° C., from 120° C. to 190° C., from 130° C. to 190° C., from 140° C. to 190° C., from 150° C. to 190° C., from 160° C. to 190° C., from 170° C. to 190° C., from 180° C. to 190° C., from 100° C. to 180° C., from 110° C. to 180° C., from 120° C. to 180° C., from 130° C. to 180° C., from 140° C. to 180° C., from 150° C. to 180° C., from 160° C. to 180° C., from 170° C. to 180° C., from 100° C. to 170° C., from 110° C. to 170° C., from 120° C. to 170° C., from 130° C. to 170° C., from 140° C. to 170° C., from 150° C. to 170° C., from 160° C. to 170° C., from 100° C. to 160° C., from 110° C. to 160° C., from 120° C. to 160° C., from 130° C. to 160° C., from 140° C. to 160° C., from 150° C. to 160° C., from 100° C. to 150° C., from 110° C. to 150° C., from 120° C. to 150° C., from 130° C. to 150° C., from 140° C. to 150° C., from 100° C. to 140° C., from 110° C. to 140° C., from 120° C. to 140° C., from 130° C. to 140° C., from 100° C. to 130° C., from 110° C. to 130° C., from 120° C. to 130° C., from 100° C. to 120° C., from 110° C. to 120° C., from 100° C. to 110° C.

Figure 3:
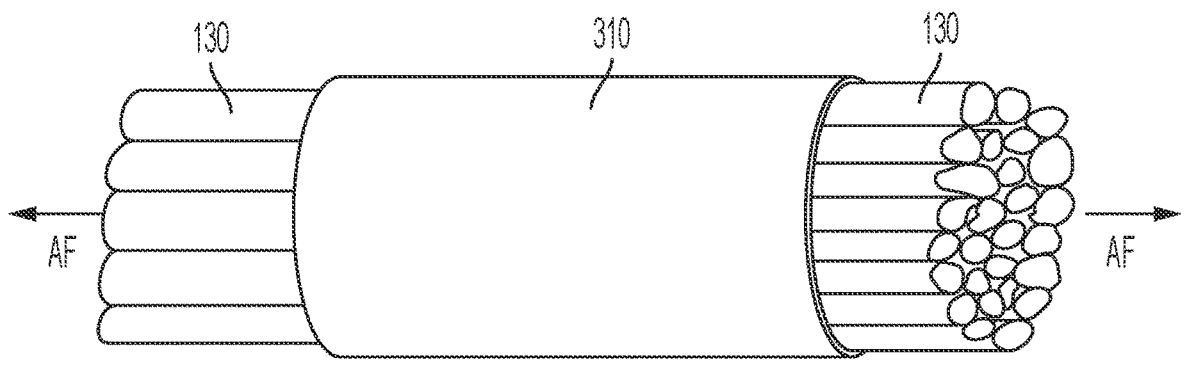
FIG. 3 is a schematic of a carbon molecular sieve adsorbent monolith made from solid polymer fibers and loaded into a mold according to embodiments disclosed and described herein.

Embodiments of methods for making the carbon molecular sieve adsorbent monolith 100—with either solid fibers 130 or hollow fibers 130 (not shown in FIG. 3)—will now be described with reference to FIG. 3. After the fibers 130 have been form from a polymer, such as PVDC as disclosed herein above, the fibers 130 are loaded into a mold 310. The mold 310 has the shape of the desired carbon molecular sieve adsorbent monolith shape. In embodiments, the mold 310 has an annular cross-section and has the form of a hollow cylinder. The diameter of the cylinder is not limited and, as referenced above, will have an inner diameter that is nearly the same as the desired diameter of the carbon molecular sieve adsorbent monolith. It should be understood that the mold 310 may have other shapes to match he desired shape of the monolith. The mold 310 may be made of any material that is capable of withstanding the processing pressures and temperatures described herein below. A bundle of fibers 130 is loaded tightly into the mold 310 such that the fibers 130 at the outer periphery of the bundle are in close, physical contact with the mold. In embodiments, the mold may also be made of a material that does not adhere to the fibers 130 that are loaded therein. In embodiments, the mold may be treated with a coating that prevents or mitigates the fibers from adhering to the mold. In one or more embodiments, the mold may be made from graphite, Teflon, alumina, ceramic, etc.

In embodiments, after the fibers 130 have been loaded into the mold 310, the mold 310 with the fibers 130 loaded therein is heated to a temperature that softens the fibers 130, such as, for example, a temperature that is at or above the softening point or glass transition temperature of the fibers 130. Because the fibers 130 are constrained by the mold 310, when the fibers 130 are heated to a temperature that is at or above the softening point or glass transition temperature of the fibers 130, the fibers 130 soften and the fibers 130 will become joined with adjacent fibers 130 in which they are in physical contact. In addition, and according to one or more embodiments, heating the fibers may cause the fibers 130 to contract in length and expand in diameter, thereby causing the fibers 130, which are constrained by the mold 310, to be pressed against one another in a softened state, which enhances the joining of adjacent fibers 130. During the process where the fibers 130 are heated to a temperature that is at or above the softening point or glass transition temperature, an axial force, such as, for example, a pulling force, may be applied to the fibers 130 to maintain their alignment within the mold 310. Arrows AF in FIG. 3 indicate the axial force. It should be understood that according to embodiments, the axial force is applied to both ends of the fibers 130 so that the fibers 130 are not removed from the mold 310. However, in embodiments, the axial force AF may be applied to only one side of the fibers 130 such that the fibers 130 are slowly moved through the mold 310. This axial force may be applied to maintain the fiber at its greatest exhibited dimension, or at some percentage thereof, prior to pretreatment and/or pyrolysis. For example, the axial force may be applied to maintain the fibers 130 at, for example, 80%, or 75%, or 90% of the greatest dimension exhibited by the fiber prior to its pretreatment and/or pyrolysis. The axial force may range from 0.01 M Pa to 10 MPa, such as from 0.1 to 1 M Pa, or from 0.1 to 0.5 M Pa.

In embodiments, the fibers 130 that are loaded into the mold 310 may be heated to a temperature from 50° C. to 350° C., from 75° C. to 350° C., from 100° C. to 350° C., from 125° C. to 350° C., from 150° C. to 350° C., from 175° C. to 350° C., from 200° C. to 350° C., from 225° C. to 350° C., from 250° C. to 350° C., from 275° C. to 350° C., from 300° C. to 350° C., from 325° C. to 350° C., from 50° C. to 325° C., from 75° C. to 325° C., from 100° C. to 325° C., from 125° C. to 325° C., from 150° C. to 325° C., from 175° C. to 325° C., from 200° C. to 325° C., from 225° C. to 325° C., from 250° C. to 325° C., from 275° C. to 325° C., from 300° C. to 325° C., from 50° C. to 300° C., from 75° C. to 300° C., from 100° C. to 300° C., from 125° C. to 300° C., from 150° C. to 300° C., from 175° C. to 300° C., from 200° C. to 300° C., from 225° C. to 300° C., from 250° C. to 300° C., from 275° C. to 300° C., from 50° C. to 275° C., from 75° C. to 275° C., from 100° C. to 275° C., from 125° C. to 275° C., from 150° C. to 275° C., from 175° C. to 275° C., from 200° C. to 275° C., from 225° C. to 275° C., from 250° C. to 275° C., from 50° C. to 250° C., from 75° C. to 250° C., from 100° C. to 250° C., from 125° C. to 250° C., from 150° C. to 250° C., from 175° C. to 250° C., from 200° C. to 250° C., from 225° C. to 250° C., from 50° C. to 225° C., from 75° C. to 225° C., from 100° C. to 225° C., from 125° C. to 225° C., from 150° C. to 225° C., from 175° C. to 225° C., from 200° C. to 225° C., from 50° C. to 200° C., from 75° C. to 200° C., from 100° C. to 200° C., from 125° C. to 200° C., from 150° C. to 200° C., from 175° C. to 200° C., from 50° C. to 175° C., from 75° C. to 175° C., from 100° C. to 175° C., from 125° C. to 175° C., from 150° C. to 175° C., from 50° C. to 150° C., from 75° C. to 150° C., from 100° C. to 150° C., from 125° C. to 150° C., from 50° C. to 125° C., from 75° C. to 125° C., from 100° C. to 125° C., from 50° C. to 100° C., from 75° C. to 100° C., or from 50° C. to 75° C.

According to embodiments, the mold 310 loaded with the fibers 130 may optionally be returned to room temperature after the mold 310 loaded with the fibers has been heated to the temperature that joins the fibers 130 to adjacent fibers 130. This cooling allows the mold 310 loaded with the fibers 130 to be more easily handled and transported. However, in embodiments, the mold 310 loaded with the fibers 130 does not need to be cooled to room temperature before further processing. Additionally, in embodiments, the fibers 130 may optionally be removed from the mold 310 before further processing to form the carbon molecular sieve adsorbent monolith, such as the further processing described below. However, in one or more embodiments, the fibers 130 are not removed from the mold 310 before further processing to form the carbon molecular sieve adsorbent monolith.

The next step in preparing the carbon molecular sieve adsorbent monolith may optionally be a pretreatment that may be employed to stabilize, or "lock," the copolymer structure prior to carbonization thereof. This pretreatment is particularly useful in embodiments that use PVDC material to stabilize the crystalline structure of the PVDC. However, in embodiments that use polyimide, the polyimide has a higher glass transition temperature and will have a stable crystalline structure even without the pretreatment step described herein below.

In the pretreatment step the as-polymerized fiber, termed as "precursor" materials at this point, are/is heated, below the melting temperature thereof (typically less than about 180° C., depending upon the exact composition of the precursor), in order to at least 10% dehydrochlorinate them/ it. As used herein, the term "at least 10% dehydrochlorinated" means that the fibers have been pre-treated, by removing hydrogen chloride, to a point at which the copolymer precursor no longer melts and, in fact, begins to become infusible. It is well accepted in the art that such a change in molecular kinetics begins to occur at a point of approximately 10% dehydrochlorination and is completed or maintained as the level of dehydrochlorination increases above that point. This step is termed a "pretreatment" because it occurs prior to a pyrolysis step, which is the treatment step wherein carbonization is accomplished.

During the pretreatment the copolymer structure's temperature is maintained in a range of from 100° C. to 180° C., such as from 120° C. to 160° C., or from 130° C. to 150° C. This is can be done in air for convenience, but other atmospheres, such as $N_2$ and other inert gases or oxidizing gases such as $CO_2$, or combinations thereof, may also or alternatively be used, since generally only minor levels of oxidation of the copolymer are anticipated within the overall given temperature range. Achievement of the desired dehydrochlorination, that is responsible for the formation of the locked structure, may be accomplished by exposure to a source of high energy irradiation, such as gamma rays, an electron beam, ultraviolet light, or a combination thereof. The time for this pretreatment may vary from 1 hour (hr) to 48 hr, such as from 1 hr to 24 hr, or from 1 hr to 12 hr, as needed to reach the at least 10% dehydrochlorination point, at which the copolymer begins to become infusible, (i.e., no longer able to be melted). The dehydrochlorination degree can vary from 10% to 100%, depending upon pretreatment temperature and time. While it is desirable that substantially all of the copolymer be dehydrochlorinated to the desired extent, it will be recognized that presence of a minor amount, desirably less than 2% by weight, of precursor that is not at least 10% dehydrochlorinated may be acceptable. Where more than visual confirmation of the beginning of infusibility is desired, additional confirmation of the percentage of dehydrochlorination may be obtained by means of, for example, Thermo Gravimetric Analysis (TGA), using standard and well-known methods and equipment.

According to embodiments, the pretreating is conducted for a duration that is sufficient to reduce the weight of the carbon molecular sieve adsorbent monolith by at least 5%, at least 7%, at least 10%, at least 12%, at least 15%, at least 17%, or at least 20%. Accordingly, in embodiments, the pretreating is conducted for a duration that is sufficient to reduce the weight of the carbon molecular sieve adsorbent monolith by 5% to 20%, 7% to 20%, 10% to 20%, 12% to 20%, 15% to 20%, 17% to 20%, 5% to 17%, 7% to 17%, 10% to 17%, 12% to 17%, 15% to 17%, 5% to 15%, 7% to 15%, 10% to 15%, 12% to 15%, 5% to 12%, 7% to 12%, 10% to 12%, 5% to 10%, 7% to 10%, 5% to 7%.

Following the dehydrochlorination pretreatment, the as-polymerized copolymer, typically still in the form of fiber, now termed the pre-treated fiber, or alternatively pre-treated CMS material, is pyrolyzed. The pyrolysis may result in at least 90 wt % of the copolymer becoming carbonized, such as at least 95 wt %, or at least 99 wt %. As already pointed out hereinabove, this pyrolysis is also termed "carbonization," because the result thereof is that the copolymer is converted to the carbon-only, or near carbon-only, skeleton of its copolymer structure, (i.e., all or virtually all atoms other than carbon have been removed, but the carbon-carbon bonds remain substantially intact), and the CMS may now be termed to be "carbonaceous."

The pyrolysis may be carried out using any means generally known to those skilled in the art, but may be carried out at an attained maximum temperature within the range of from 500° C. to 1500° C., from 600° C. to 1500° C., from 700° C. to 1500° C., from 800° C. to 1500° C., from 900° C. to 1500° C., from 1000° C. to 1500° C., from 1100° C. to 1500° C., from 1200° C. to 1500° C., from 1300° C. to 1500° C., from 1400° C. to 1500° C., from 1500° C. to 1500° C., from 1600° C. to 1500° C., from 500° C. to 1600° C., from 600° C. to 1600° C., from 700° C. to 1600° C., from 800° C. to 1600° C., from 900° C. to 1600° C., from 1000° C. to 1600° C., from 1100° C. to 1600° C., from 1200° C. to 1600° C., from 1300° C. to 1600° C., from 1400° C. to 1600° C., from 1500° C. to 1600° C., from 500° C. to 1500° C., from 600° C. to 1500° C., from 700° C. to 1500° C., from 800° C. to 1500° C., from 900° C. to 1500° C., from 1000° C. to 1500° C., from 1100° C. to 1500° C., from 1200° C. to 1500° C., from 1300° C. to 1500° C., from 1400° C. to 1500° C., from 500° C. to 1400° C., from 600° C. to 1400° C., from 700° C. to 1400° C., from 800° C. to 1400° C., from 900° C. to 1400° C., from 1000° C. to 1400° C., from 1100° C. to 1400° C., from 1200° C. to 1400° C., from 1300° C. to 1400° C., from 500° C. to 1300° C., from 600° C. to 1300° C., from 700° C. to 1300° C., from 800° C. to 1300° C., from 900° C. to 1300° C., from 1000° C. to 1300° C., from 1100° C. to 1300° C., from 1200° C. to 1300° C., from 500° C. to 1200° C., from 600° C. to 1200° C., from 700° C. to 1200° C., from 800° C. to 1200° C., from 900° C. to 1200° C., from 1000° C. to 1200° C., from 1100° C. to 1200° C., from 500° C. to 1100° C., from 600° C. to 1100° C., from 700° C. to 1100° C., from 800° C. to 1100° C., from 900° C. to 1100° C., from 1000° C. to 1100° C., from 500° C. to 1000° C., from 600° C. to 1000° C., from 700° C. to 1000° C., from 800° C. to 1000° C., from 900° C. to 1000° C., from 500° C. to 900° C., from 600° C. to 900° C., from 700° C. to 900° C., from 800° C. to 900° C., from 500° C. to 800° C., from 600° C. to 800° C., from 700° C. to 800° C., from 500° C. to 700° C., from 600° C. to 700° C., from 500° C. to 600° C.

Forming a carbon molecular sieve adsorbent monolith according to embodiments disclosed and described herein, it is possible to make a carbon molecular sieve adsorbent monolith having micropores within a range from 3.0 Angstrom (A) to 5.0 A, may be preselected according to a desired separation utility. Pre-selection of the desired average micropore size can then be correlated with a known and/or also preselected precursor (pre-pyrolysis) crystallinity of the precursor material and an attained maximum pyrolysis temperature in order to obtain a carbon molecular sieve adsorbent monolith having the desired average micropore size.

Following pyrolysis, embodiments of the carbon molecular sieve adsorbent monolith has an average micropore size ranging from 3.0 A to 5.0 A, is complete. In particular embodiments, the average micropore size ranges from 4.0 A to 4.3 A, and is thus capable of admitting propylene molecules while excluding propane molecules. In another embodiment the average micropore size ranges from 3.7 A to 4.1 A, and is thus capable of admitting ethylene molecules while excluding ethane molecules. In embodiments, the average micropore size ranges from 3.64 A to 3.8 A, and is thus capable of admitting nitrogen molecules while excluding methane molecules. In embodiments, the average micropore size ranges from 3.0 A to 3.64 A, and is thus capable of admitting carbon dioxide molecules while excluding nitrogen molecules. In embodiments, the average micropore size ranges from 4.3 A to 5.0 A, and is thus capable of admitting n-butane molecules while excluding/iso-butane molecules. Thus, the inventive compositions are particularly desirable for these particular separations, but may, in other non-limiting embodiments, be useful in certain other separations.

EXAMPLES

Embodiments will be further clarified by the following examples.

Example 1

A first precursor PVDC fiber (fiber 1) was obtained from Asahi Kasei (800D/100. It was a continuous multifilament (10 fiber/strand) hollow fiber product with a total size of 800 denier. The PVDC resin density was about 1.6 g/cm$^3$ and OD/ID ratio was about 2. The OD was about 97 micron.

A second precursor PVDC fiber (fiber 2) was obtained from Swicofil (PVDC-017-B 750). It was a monofilament solid fiber product with diameter of 170 micron.

About an 18 inch length of 800 strands of fiber 1 (totally 8000 hollow fibers) were pulled through a graphite tube (inner diameter 0.5 inch, length 10 inches). The graphite tube containing fiber bundle was heated to 160° C. for 24 hours in air in an oven in which a scrubber containing a 10 wt % sodium hydroxide solution was connected. After cooling down to room temperature, the monolith bundle was formed and slid freely out of the graphite tube. This will subsequently be referred to as polymer monolith 1.

A second polymer monolith (polymer monolith 2) was prepared in the same way, but using 600 strands of fiber 2.

The self-laminated monoliths (polymer monolith 1 and polymer monolith 2) were pyrolyzed via the following two stage thermal treatment:

Polymer monolith 1 and polymer monolith 2 were loaded into a 5/8 inch inner diameter graphite tube and loaded into a 5.5 inch ID quartz tube furnace. A scrubber connected to this furnace contained a 10 wt % sodium hydroxide aqueous solution. The loaded furnace was heated to 650° C. at a ramp rate of 5° C./min and held for 30 min, under 5 L/min of nitrogen, before cooling to an ambient temperature.

The second stage of pyrolysis was then carried out in a graphite furnace. The prepyrolyzed monoliths were inserted into a 0.5 inch ID by 3 inch long graphite tube, which was then placed in a graphite boat measuring 4 inches by 4 inches by 0.5 inch (4"×4"×0.5"). The boat containing each sample was heated to 1200° C. at a ramp rate of 10° C./min and held for 60 min, with a 10 L/min of nitrogen purge (one volume turnover every 12 min). After completion of the pyrolysis for each polymer monolith, the furnace was cooled at a ramp rate of 10° C./min to 450° C., below which the furnace is allowed to cool to ambient temperature at a slower rate due to the heat transfer limitations.

Figure 4A:
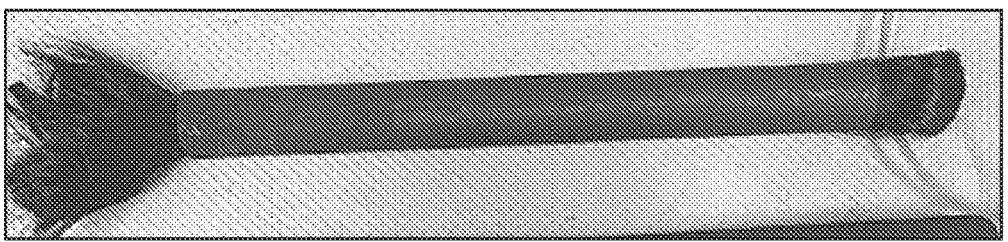
FIG. 4 is a magnified photograph of a cross section of a carbon molecular sieve adsorbent monolith made from hollow fibers according to embodiments disclosed and described herein.
Figure 4B:
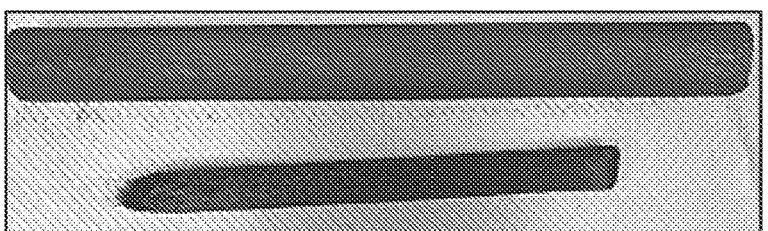
Figure 5:
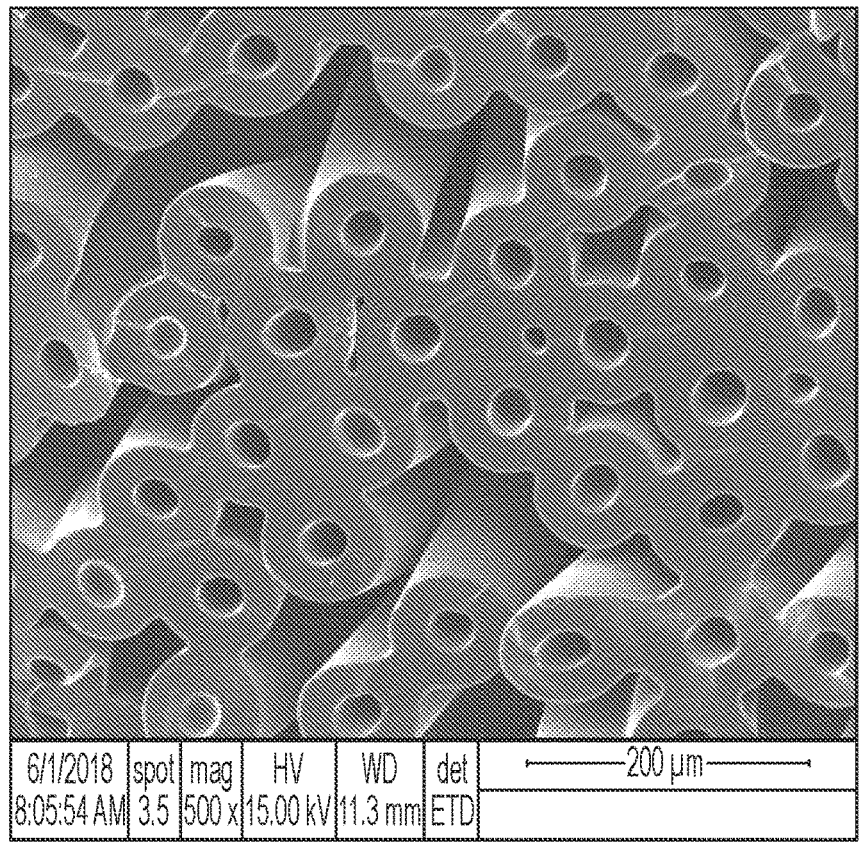
FIG. 5 is a magnified photograph of a cross section of a carbon molecular sieve adsorbent monolith made from solid fibers according to embodiments disclosed and described herein.

CMS monolith 1 and CMS monolith 2 were made using the polymer monolith 1 and 2 respectively. As shown in the cross-section of the CMS monolith in FIG. 4 and FIG. 5, respectively, the original fiber geometry was maintained and partial fusion of fiber edge provided (by mechanical bonding) joined, strong monolith structures. The parallel channels created from the inter-fiber spacing and retained from the original hollow fiber bundle can both provide low gas flow resistance and large contact surface area.

Propylene/Propane Transient Adsorption Test

A sample of 100-300 mg of CMS monolith was cut off the polymer monolith as prepared above and loaded into a ceramic cell of a TA instrument Q50. The sample was heated to 150° C. for 30 minutes with helium (He) purge at 25 sccm before being cooled down to 90° C. for the adsorption. The 25 sccm of helium purge is then switched to a 25 sccm of mixture containing 50 mol % He and 50 mol % propylene (C$_3$H$_6$). The time of gas switching was recorded as the adsorption starting time and the adsorption is stopped when no weight gain was further detected or 24 hours was reached. The weight gain can be considered as only due to the 0.5 bar of propylene even though the CMS sample is exposed to a mixture because the adsorbed amount of hydrocarbon is much higher than the adsorbed amount of helium. The propane (C$_3$H$_8$) transient adsorption was carried out similarly using a new CMS sample and changing the mixture gas to 50 mol % He and 50 mol % C$_3$H$_8$ before starting the adsorption.

Figure 6:
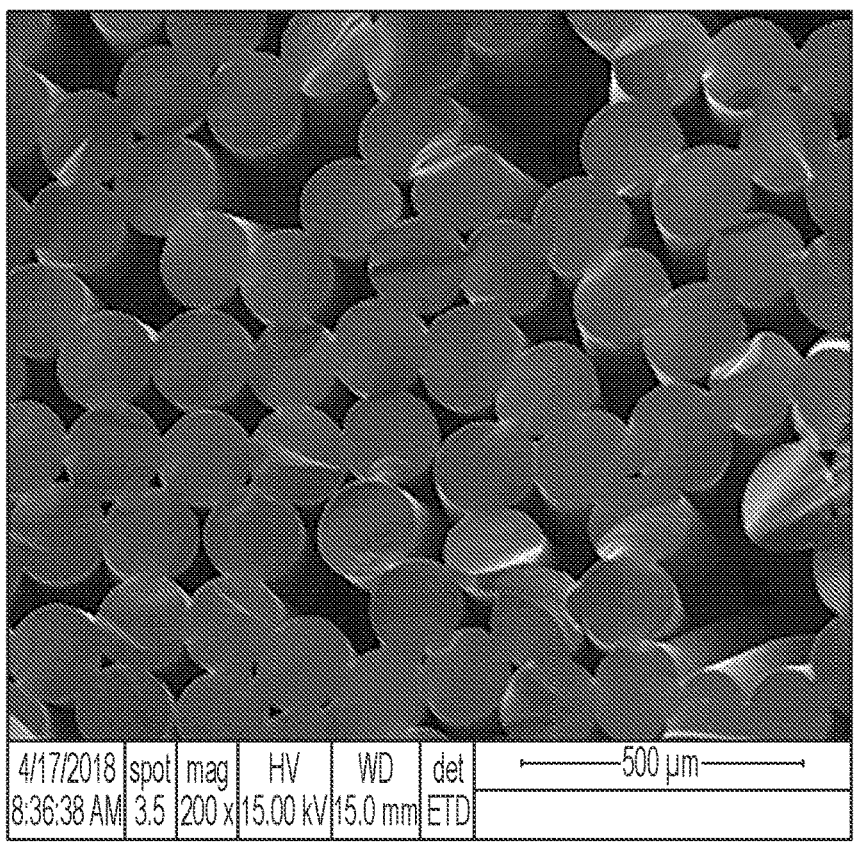
FIG. 6 is a graph of propylene and propane uptake versus time in carbon molecular sieve adsorbent monoliths according to embodiments disclosed and described herein.

As shown in FIG. 6, C$_3$H$_6$ adsorbs much faster in the CMS monolith 1 than C$_3$H$_8$. At the time (1.55 min) C$_3$H$_6$ adsorption reaching 50% of that of equilibrium (0.0924 g C$_3$H$_6$/g CMS), the amount of C$_3$H$_8$ adsorption is only 0.00127 g C$_3$H$_8$/g CMS. The selectivity is, therefore, 36.

Example 2

A precursor Matrimid hollow fiber (fiber 3) was obtained using the method as shown in: L. Xu, M. Rungta, W. J. Koros, Matrimid® derived carbon molecular sieve hollow fiber membranes for ethylene/ethane separation, J. Membr. Sci. 380(1-2) (2011) 138-147. The OD/ID ratio was about 2. The OD was about 550 micron.

Figure 7:
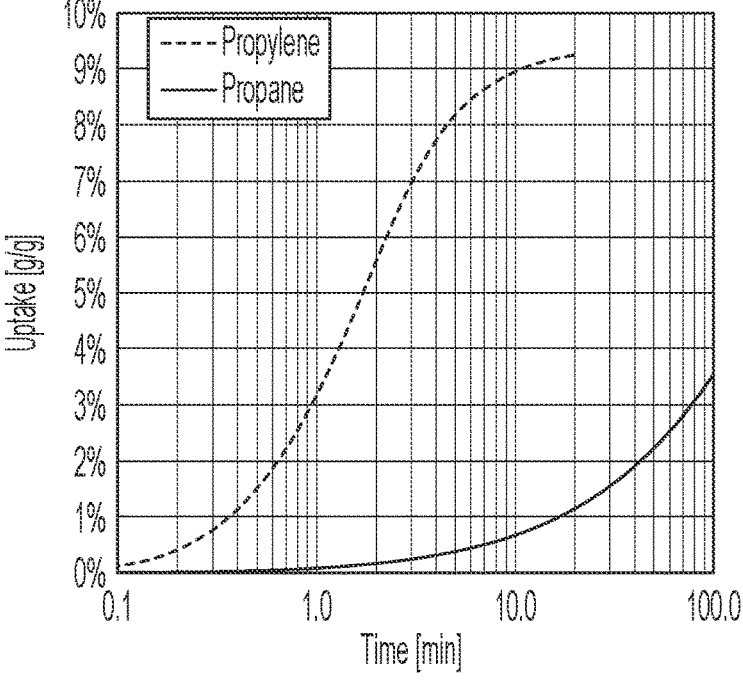
FIG. 7 is a magnified photograph of a carbon molecular sieve adsorbent monolith made from hollow fibers according to embodiments disclosed and described herein.
Figure 8:
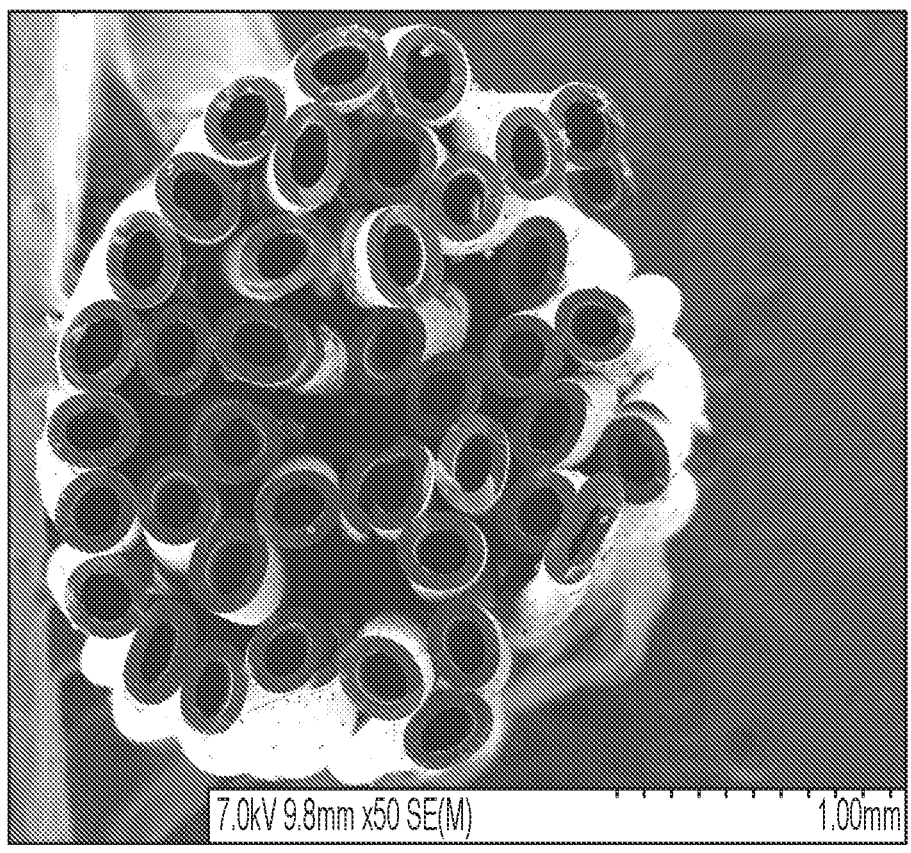

About a 3 inch length of 44 fiber 3 were pulled through a graphite tube (inner diameter 0.16 inch, length 10 inches). The graphite tube containing the hollow fiber bundle was loaded into a quartz tube furnace. The loaded furnace was heated to 550° C. using a three-step ramp (preheat to 70° C., raise to 250° C. at a rate 13.34° C./min, raise to 535° C. at a rate of 3.85° C./min; raise to 550° C. at a rate of 0.25° C./min and hold for 2 hours) under a continuous nitrogen purge, before cooling to an ambient temperature. FIG. 7 shows a monolith CMS that was formed.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The invention claimed is:

1. A method for forming a carbon molecular sieve comprising:
   loading polymer fibers comprising polyvinylidene chloride or polyimide into a mold;
   heating the mold containing the polymer fibers to a temperature in a range from 50° C. to 350° C. to form a polymer monolith;
   pretreating the polymer monolith by heating the polymer monolith at a pretreating temperature that is below the melting point of the polymer monolith, wherein the pretreating temperature is from 120° C. to 180° C.; and
   pyrolizing the polymer monolith by heating the polymer monolith to a temperature in a range from 500° C. to 1700° C.

2. The method of claim 1, wherein the polymer fibers comprise polyimide.

3. The method of claim 1, wherein the polymer fibers comprise polyvinylidene chloride.

4. The method of claim 3, wherein the polyvinylidene chloride is formed from monomers selected from the group consisting of vinyl monomers, acrylate monomers, methacrylate monomers, styrenic monomers, chlorotrifluroethylene, and mixtures thereof.

5. The method of claim 1, wherein the polymer fibers are aligned in parallel such that first axial ends of the carbon molecular sieve fibers are positioned at the first end of the carbon molecular sieve monolith and second axial ends of the carbon molecular sieve fibers are aligned at the second end of the carbon molecular sieve monolith.

6. The method of claim 1, wherein the pyrolyzed carbon molecular sieve monolith has a cell density of greater than 500 cells per square inch.

7. The method of claim 1, wherein pretreating the polymer monolith occurs until a weight of the polymer monolith is reduced by at least 5%.

8. The method of claim 1, wherein pretreating the polymer monolith occurs until a weight of the polymer monolith is reduced by from 5% to 20%.

9. The method of claim 1, wherein the heating step comprises heating the mold containing the polymer fibers to a temperature in a range from 50° C. to 200° C.

10. The method of claim 1, wherein an axial force is applied to the polymer fibers during the step of heating the mold containing the polymer fibers.

11. The method of claim 10, wherein opposing axial forces are applied to opposite ends of the polymer fibers during the step of heating the mold containing the polymer fibers.

12. The method of claim 1, wherein the method further comprises cooling the mold containing the polymer fibers to an ambient temperature after forming the polymer monolith but before pretreating the polymer monolith.

13. The method of claim 1, wherein the pyrolizing step comprises heating the polymer monolith to a temperature in a range from 500° C. to 1300° C.

* * * * *